United States Patent [19]

Timmer et al.

[11] 4,154,683
[45] May 15, 1979

[54] TWO-STAGE OIL-SEPARATOR

[75] Inventors: Henry Timmer, 2705 Rockhill Dr., Grand Rapids, Mich. 49505; Leslie V. Slikkers, Grand Rapids, Mich.

[73] Assignee: Henry Timmer, Grand Rapids, Mich.

[21] Appl. No.: 858,848

[22] Filed: Dec. 8, 1977

[51] Int. Cl.² .................. B01D 33/02; E02B 15/04
[52] U.S. Cl. .................. 210/238; 210/386; 210/396; 210/400; 210/DIG. 26
[58] Field of Search ............ 210/238, 241, 242 S, 210/332, 335, 386, 396, 397, 400, 402, DIG. 25, DIG. 26

[56] References Cited

U.S. PATENT DOCUMENTS

| 3,358,838 | 12/1967 | Kosar et al. | 210/DIG. 26 |
| 3,508,663 | 4/1970 | Brill | 210/DIG. 26 |
| 3,640,394 | 2/1972 | Brill et al. | 210/DIG. 26 |
| 3,804,251 | 4/1974 | Farrell et al. | 210/DIG. 25 |
| 3,905,902 | 9/1975 | Hoegberg et al. | 210/DIG. 25 |
| 3,968,041 | 7/1976 | DeVoss | 210/DIG. 25 |

Primary Examiner—Robert H. Spitzer
Attorney, Agent, or Firm—Glenn B. Morse

[57] ABSTRACT

A machine for separating an oil film from a supporting liquid elevates the oil from its original position with an endless belt, and then transfers the oil from the belt to a rotating disc from which it is wiped into a drainage trough. The belt system is driven from the disc, and is constructed as an attachment to a self-contained disc machine capable of functioning without the belt system when the disc can intersect the surface of the liquid. The unit is thus adaptable to installations where the liquid level is far below the rim of the accumulating tank where the machine is mounted, and where there is substantial variation in the liquid level.

5 Claims, 8 Drawing Figures

TWO-STAGE OIL-SEPARATOR

BACKGROUND OF THE INVENTION

The separation of an oil film from the surface of a supporting liquid such as water can be accomplished by rotating a disc at low speed in a position where it intersects the surface of the liquid, followed by wiping the adhering oil from the disc into a drainage trough. An example of this type of device is shown in the application of Harold J. Baer and Glenn B. Morse, application Ser. No. 551,161, which is pending in the U.S. Patent and Trademark Office at the time of the filing of the present application. The application here referred to provides for the removal of the oil film from the rotating disc with strips that are preferably flexible, and are attracted to the disc by magnetic forces. The conventional form of the rotating-disc machine prior to the development of the magnetic wiping arrangement provided for spring-loaded wiping devices of various types, which generated certain problems that appear to be inherent.

Another type of oil-recovery device centers in the action of an endless belt having generally vertical courses passing around a pulley or roller immersed in the composite liquid. Oil film adhering to the upward course is removed usually by some sort of wiping device, where it passes into a drainage trough. Examples of United States Patents showing oil-recovery devices described in these general terms are identified as follows:

| Kosar, et al. | 3,358,838 | 1967 |
| Farrell, et al. | 3,804,251 | 1974 |

A very large field of application of these oil-recovery devices is in association with factory machinery in which water-base coolant becomes intermixed with lubricating oil in the machine. The supply tank associated with the coolant system thus becomes contaminated with an oil film, which eventually becomes rancid and produces a number of problems which need not be enumerated here. A recovery device is usually installed at the rim of the accumulating tank, where it can be clamped very conveniently in operating position. A disc-type device is highly effective because of its simplicity wherever such an installation can be made with the disc intersecting the surface of the composite liquid. Where the liquid level is far below the rim of the accumulating tank, or where the level is subject to large fluctuation, the diameter of a disc device required for that installation becomes excessive. In these situations where it is necessary to elevate the oil for a substantial distance to the position where it is ultimately transferred to a drainage trough, a belt system is particularly effective. Obviously, a very considerable height can be accommodated without producing a transverse dimension that becomes impractical. Belts are difficult to wipe as cleanly as discs, however, and there would be considerable advantage in a machine which could utilize the elevating capabilities of the belt in conjunction with the wiping capabilities of the disc machine. It would also be highly desirable to have such a machine capable of convenient separation between the belt and disc systems, so that the elevating device need only be installed as an attachment to a standard disc machine where it appears to be necessary to do so.

SUMMARY OF THE INVENTION

A belt attachment is installed in conjunction with a disc-type oil separator to elevate the oil from the surface of a composite liquid to a transfer station where it is passed over to a disc, from which it is wiped into a drainage trough. The separable belt attachment is driven from the disc itself, and is provided with belt-supporting structure that is easily accommodated to various distances from the rim of the accumulating tank to the various positions of the surface of the composite liquid. Oil film is removed from the belt by a squeezing action between rollers similar to that of the old-style laundry wringer. This action produces a mass of accumulated oil at the "nip" between the two rollers, where the entrance to a transfer trough is placed. Drainage from this trough passes the oil over to the surface of the rotating disc.

DESCRIPTION OF THE PREFERRED EMBODIMENT

Figure 1:
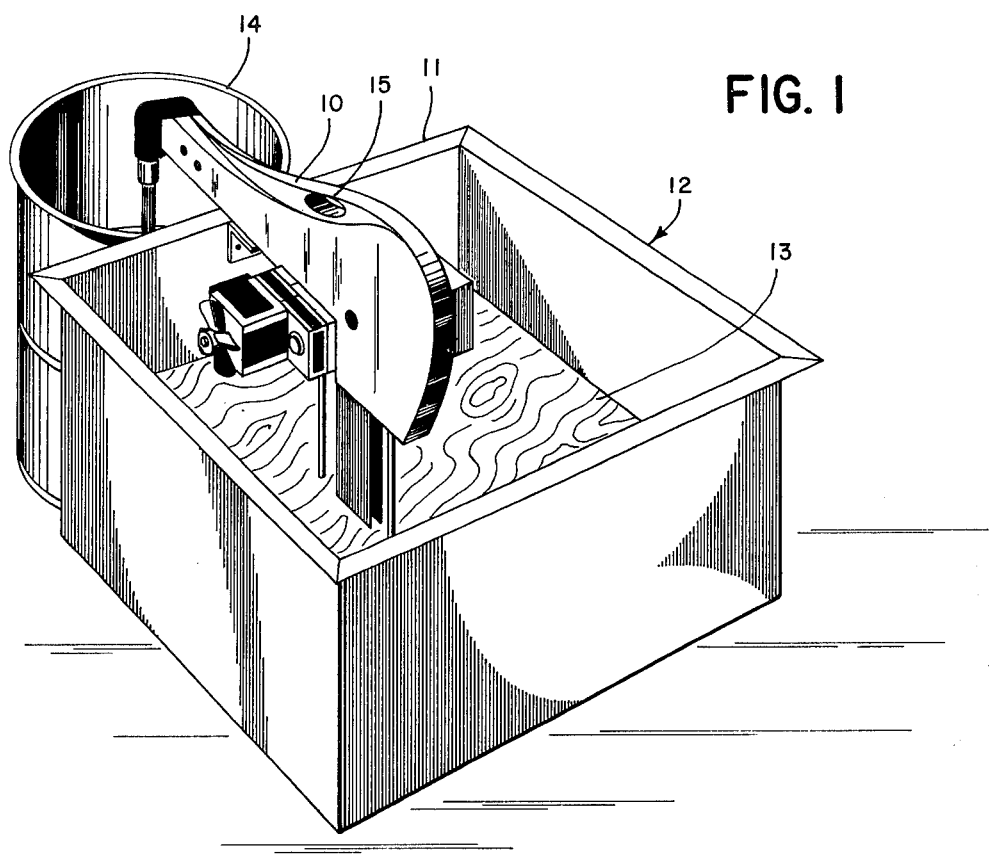
FIG. 1 is a perspective view showing an oil-recovery device installed at the edge of an accumulating tank.
Figure 2:
FIG. 2 is a view showing the device in a portable form being carried to or from an installation.
Figure 3:
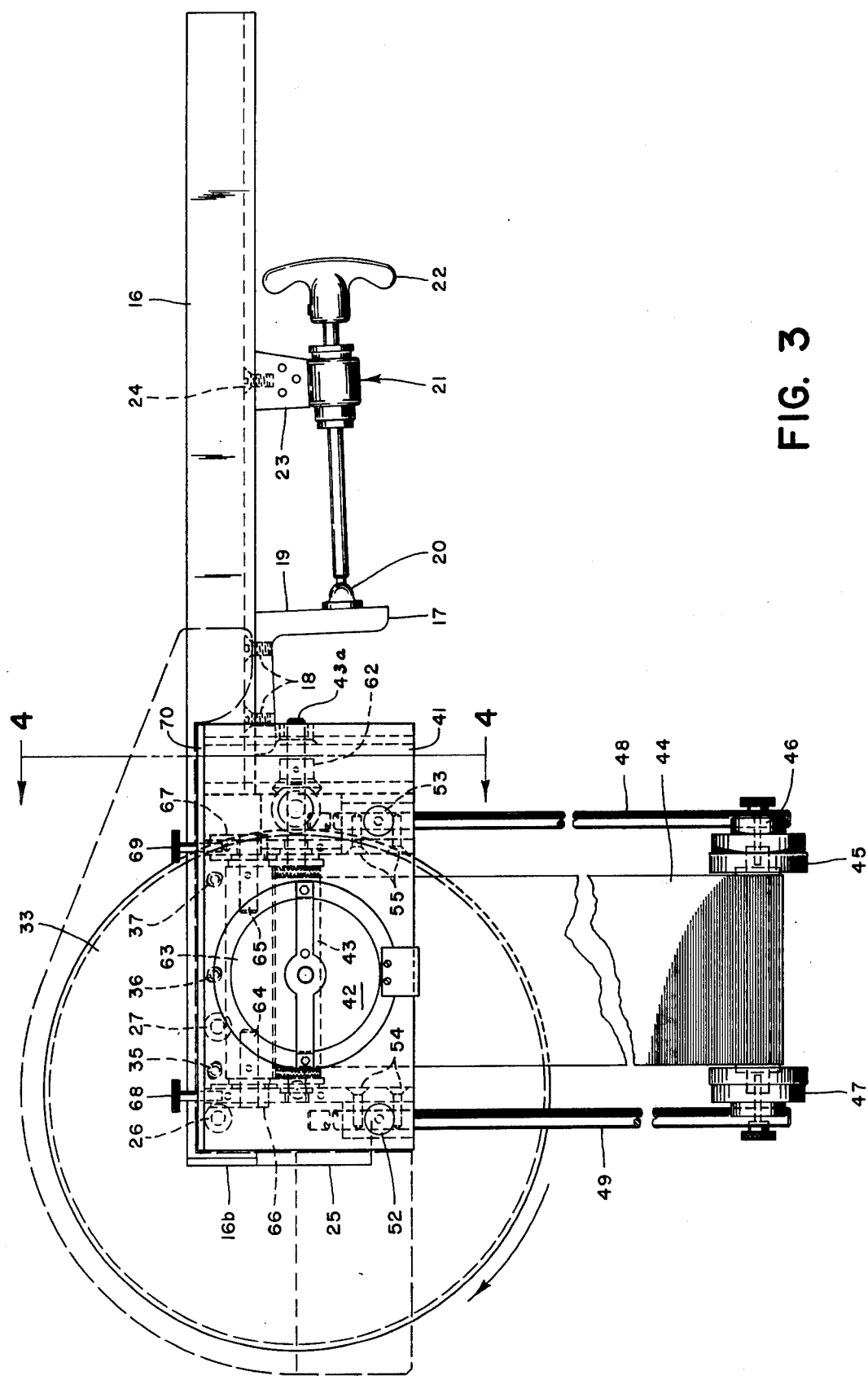
FIG. 3 is a side elevation on an enlarged scale over that of FIG. 1, showing a complete two-stage oil-recovery device.
Figure 4:
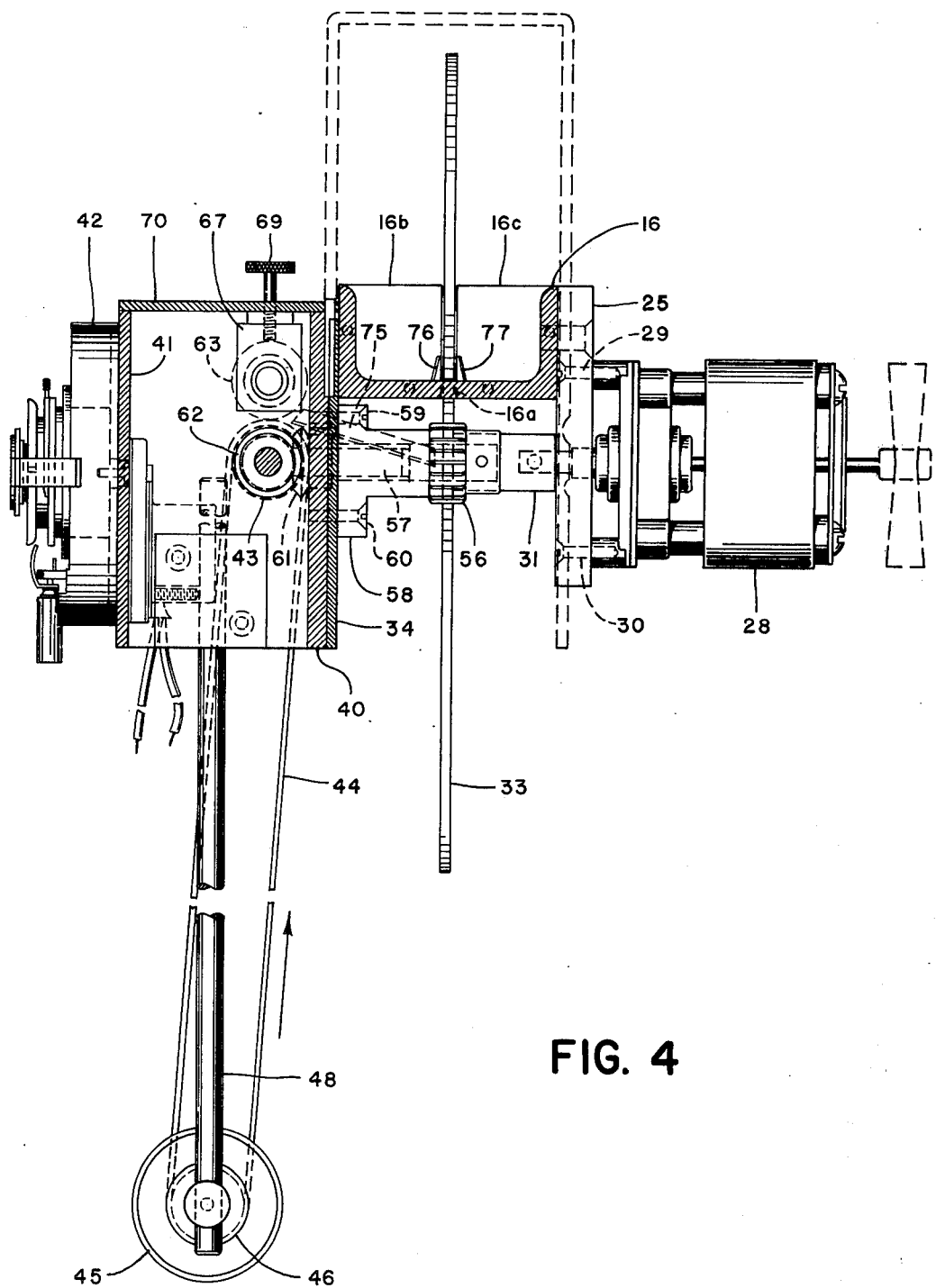
FIG. 4 is a sectional view on the plane 4—4 of FIG. 3.
Figure 5:
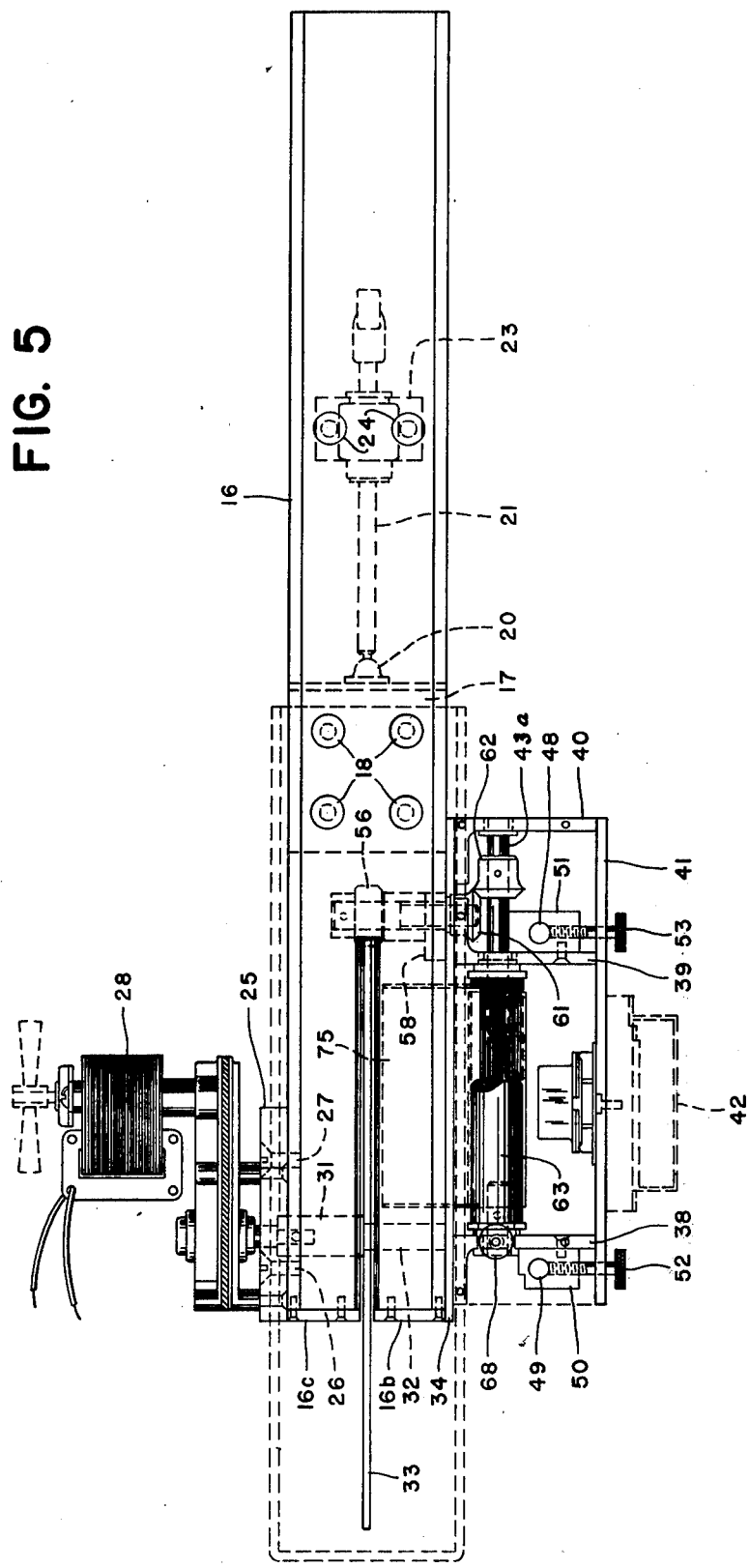
FIG. 5 is a top view with respect to FIGS. 3 and 4.
Figure 6:
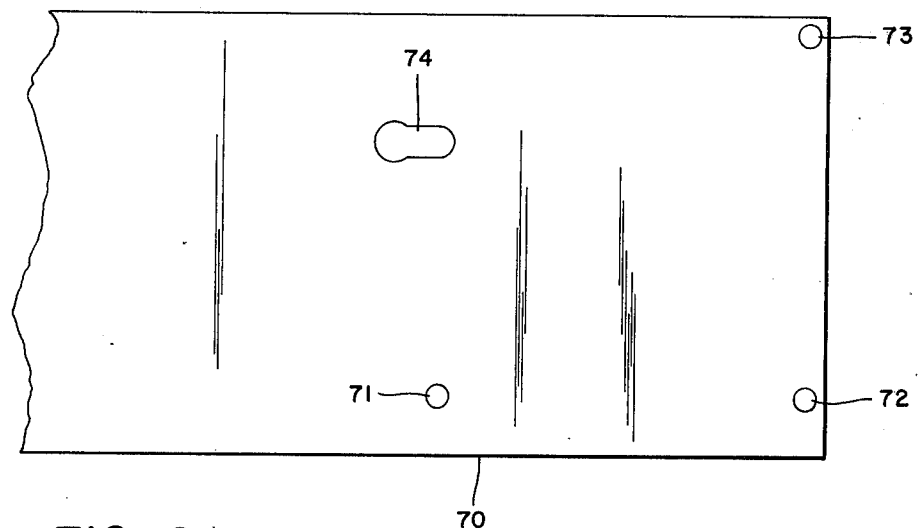
FIG. 6 is a plan view of the plate forming an upper portion of the frame of the device.

Referring to FIG. 1, the oil-separating device referred to generally at 10 is shown clamped to the rim 11 of the liquid-accumulating tank 12. The surface 13 of a mixed-phase liquid is considerably below the level of the rim 11, and the separating device functions to elevate the oil from the surface 13, and then transfer it to the drum 14. An accumulating tank 12 may be associated with practically any type of metal-working machine in which water-base coolant is inevitably contaminated with lubricating oil. In the normal operation of the machine, the coolant is continually recirculated past the cutting or processing area by a pumping system (not shown). This coolant system will usually include a tank 12 of substantial proportions to permit the liquid to become sufficiently stagnant for metal particles to settle out. Such an arrangement minimizes the necessary capacity of the filtration system usually associated with the coolant recirculation. If the accumulations of oil are not removed from the surface 13, they tend to become rancid and promote the growth of a form of bacteria that produces very unpleasant odors. Continuous or periodic removal of the oil film eliminates this undesirable condition, and keeps the liquid in the condition in which it is much less hazardous to health. Since it is usually unnecessary to operate an oil separator continuously during the running of the machine with which it is associated, it is possible to remove the machine from one tank, and install it on another. The portability of the machine is illustrated in FIG. 2, in which an attendant is shown carrying the complete unit by its handle indicated at 15. FIGS. 1 and 2 show the machine with the exterior housing attached, and FIGS. 3, 4, and 5 show a housing of smaller dimensions in dotted lines. The housing structure is entirely optional.

Referring to FIGS. 3, 4, and 5, the drainage trough 16 is in the form of a steel channel, which also functions as a beam supporting the device in its installed position on a tank, as shown in FIG. 1. The angle block 17 is secured to the underside of the channel 16 by screws as indicated at 18, and it should be noted that the surface of the angle 17 that bears on the channel 16 is not perpendicular to the clamping surface 19. The channel 16 is disposed at a downward angle of inclination, so that the oil will drain from the separating mechanism outwardly. The foot 20 of the clamping device generally indicated at 21 will normally bear on the outside of a tank as the handle 22 is tightened. The clamping device 21 will normally be mounted on an abutment as indicated at 23, which is secured to the underside of the channel 16 by screws as indicated at 24.

A bracket plate 25 is secured to one side of the channel 16 by screws as indicated at 26 and 27. A standard motor 28 is mounted on this bracket with another set of screws as indicated at 29 and 30. The motor unit 28 includes a speed reducer which engages a coupling 31 associated with the shaft 32 of the separating disc 33. The opposite end of this shaft is rotatably received in the frame plate 34 secured to the side of the channel 16 by fastenings as shown at 35-37. These fastenings traverse slots in the frame plate 34 that are elongated in directions that are tangential with respect to the axis of the disc shaft 32, in order to provide a degree of adjustability of the mechanism supported by the frame plate 34. Referring particularly to FIG. 5, the angle members 38-40 are secured to the frame plate 34 by fastenings (not shown) or welding, and the outer frame plate 41 is similarly secured to the extremities of these angle members. A standard timing device 42 is shown attached to the outer plate 41 as an optional item for establishing a periodic control of the motor unit 28.

A belt-supporting roller 43 has a shaft 43a rotatably mounted in the angle members 38, 39, and 40. The endless belt 44 extends around the roller 43 and also the lower roller 45 carried by the bearing assemblies 46 and 47 secured to the vertical rods 48 and 49, respectively, adjustably held in the blocks 50 and 51 by the clamping screws 52 and 53 in threaded engagement with these blocks. The blocks themselves are secured respectively in the angle members 38 and 39 by screws as indicated at 54 and 55 in FIG. 3.

Operation of the motor unit 28 rotates the disc 33 at a very low speed, and the toothed periphery of this disc interengages with the spur gear 56 carried by the shaft 57 rotatably mounted in the bearing boss 58 secured to the frame plate 34 by screws as shown at 59 and 60 in FIG. 4. The rotation of the shaft 57 causes corresponding rotation of the bevel gear 61 in mesh with the second bevel gear 62 secured to the shaft 43a of the belt roller 43.

A squeezing roller 63 has a pair of opposite shaft projections 64 and 65 rotatably mounted in the bearing blocks 66 and 67 mounted for vertical sliding movement in appropriate slots in the angle members 38 and 39 under the control of the adjustment screws 68 and 69 which establish a desired degree of bearing pressure on the roller 63 to create the necessary squeezing action for removing accumulations of oil from the belt 44. The top plate 70 covers the upper portion of the power-transfer mechanism, and provides a fixed support for these pressure-adjustment screws. The plate itself is secured to the upper extremities of the angle members 38-40 with fastenings traversing holes as shown at 71-73, and both of the adjustment screws 68 and 69 traverse keyhole openings as indicated at 74. These keyhole openings are proportioned so that the threaded diameter of the screws 68 and 69 passes through the major width of the keyhole openings, and a peripheral groove of reduced diameter on the screws is received in the portions of the keyhole openings 74 of reduced width. This arrangement results in a fixed vertical position of the screws 68 and 69, and the ability to position the bearing blocks 66 and 67 by rotation of the screws in their engagement with these bearing blocks. FIG. 5 of the drawings shows the cover 70 removed to expose the interior of the mechanism.

Referring to FIGS. 4 and 5, the transfer of the oil squeezed out of the belt 44 between the rollers 43 and 63 accumulates opposite the end of the transfer trough 75, the upper end of which extends into the nip area between the rollers. From this point, it extends at a downward incline to a point adjacent the surface of the disc 33, so that rotation of the disc will cause the oil draining down along the transfer trough 75 to be transferred to the disc on the downward side of its rotation, from which it proceeds around and upward to the position of the wipers 76 and 77 supported by the base of the drainage trough 16, and held against the disc 33 (of steel or other magnetic material) by magnetic action. The disc 33 operates in the slot 16a in the base of the channel 16, which approaches the disc 33 close enough to provide support for the wipers 76 and 77. The spaced end plates 16b and 16c on the trough 16 are optional.

Figure 7:
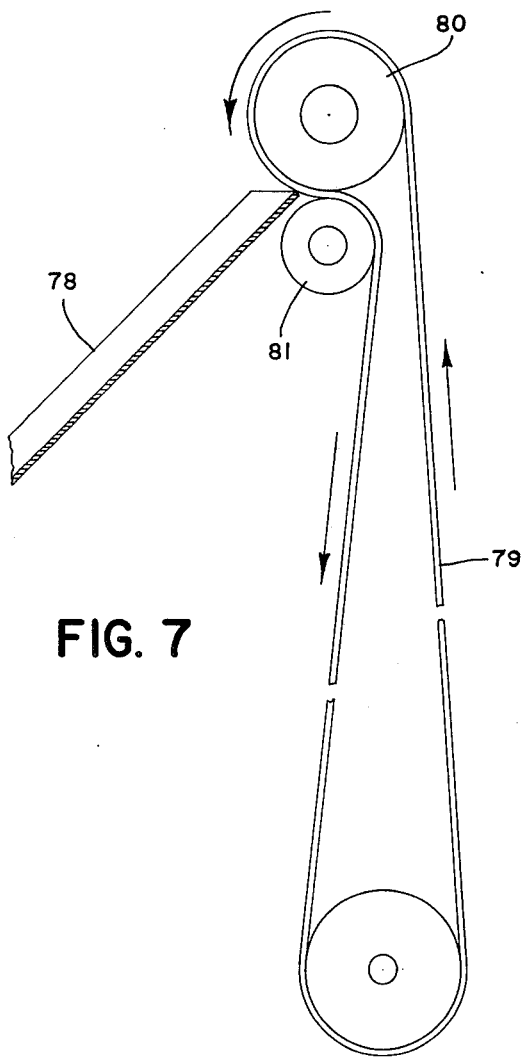
FIG. 7 is a schematic view illustrating a modified form of the invention with regard to the belt arrangement.
Figure 8:
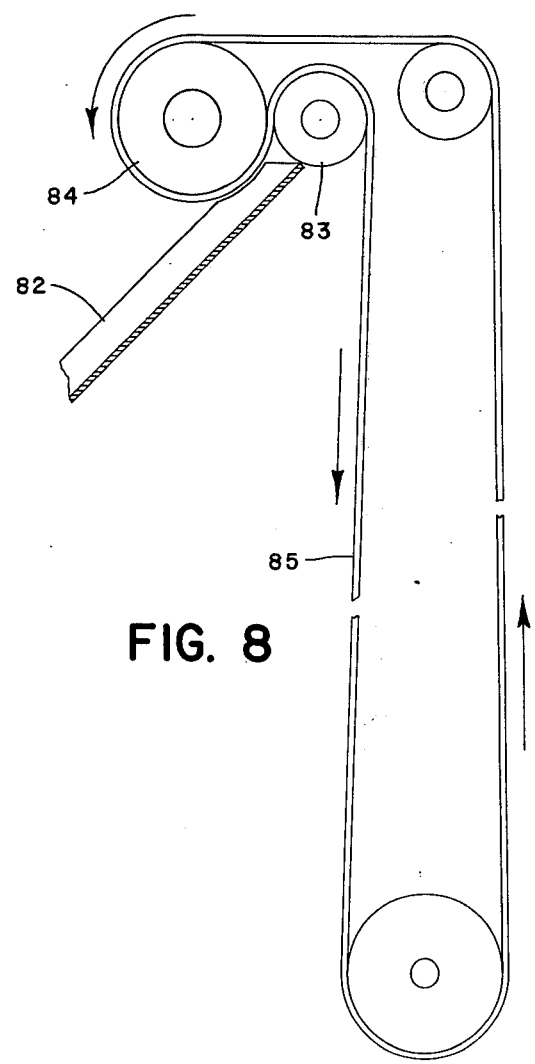
FIG. 8 illustrates a further modification of the invention with regard to the belt arrangement.

FIGS. 7 and 8 show modified forms of the invention with respect to the path of movement of the belt, and the position of a transfer trough to take best advantage of these particular configurations. In the FIG. 4 arrangement previously described, the oil film adhering to the upward course of the belt 44 must pass underneath the transfer trough 75, and thus the trough must be installed with clearance over the belt to avoid scrapping the oil off on the underside of the trough. While this would probably still result in a drainage downward to the disc as result of adherence of the oil to the underside of the trough, the confinement of the oil is not as complete. It has been found preferable to install the trough with approximately a sixteenth of an inch of clearance over the belt at the point where the entrance of the trough approaches the nip of the rollers. A gap at this point of between a thirty second to an eighth of an inch seems to be operational. The arrangement shown in FIGS. 7 and 8 provides the advantage of a more nearly downward movement of the oil into the transfer trough, as opposed to the generally horizontal movement of the belt at the point of approach of the two rollers in FIG. 4. In FIG. 7, the transfer trough entrance can actually scrape the belt 79 gently, if desired. The upper roller 80 and the lower roller 81 provide a squeezing action which entraps the accumulating oil at the nip of these rollers, and the transfer trough 78 can also be installed slightly downward from the position illustrated in FIG. 7 in which may actually drag on the lower roller 81. In FIG. 8, the transfer trough 82 is installed close to the smaller roller 83, which is pressed against the larger roller 84 to apply a squeezing action on the belt 85. This arrangement provides a very effective oil-removal system that combines a direct downward movement of the accumulated oil from between the nip of the rollers 83 and 84, and into the trough 82.

We claim:

1. A machine for separating a floating liquid from a supporting liquid, said machine including a frame, means for securing said frame to a tank, a disc rotatably mounted in said frame on a normally horizontal axis of rotation, drive means for said disc, a drain trough adjacent said disc, and wiper means adapted to remove liquid adhering to said disc at a position to flow from said wiper means to said drain trough, wherein the improvement comprises:

first and second rollers rotatably mounted in said frame on normally horizontal axes;
   a belt interposed under pressure between said rollers, said belt normally extending downward below the level of the bottom tangent to said disc;
   a transfer trough extending from the convergence between said rollers at a downward incline to a position adjacent said disc, said transfer trough having clearance over said belt at said convergence; and
   drive means for said rollers including a toothed periphery on said disc, and power take-off means including a spur gear interengaged with said toothed periphery and mounted on a shaft rotatably supported in said frame, and further including angle drive means adapted to transfer torque from said shaft to at least one of said rollers.

2. A machine as defined in claim 1, additionally including removable frame components extending downwardly, and a lower roller rotatably mounted at the lower extremity of said components and receiving said belt.

3. A machine as defined in claim 2, wherein said frame components include at least one rod slideably received in said frame, and securing means for maintaining the adjusted position of said rod with respect to said frame.

4. A machine as defined in claim 1, wherein said transfer trough clears said belt by between one thirty-second and one-eighth of an inch.

5. A machine as defined in claim 1, wherein said belt enters said convergence from a position above said transfer trough.

* * * * *